(12) United States Patent
Detcheverry et al.

(10) Patent No.: US 6,700,796 B2
(45) Date of Patent: Mar. 2, 2004

(54) TRANSPONDER AND APPLIANCE

(75) Inventors: Celine Juliette Detcheverry, Eindhoven (NL); Cornelis Maria Hart, Eindhoven (NL); Dagobert Michel De Leeuw, Eindhoven (NL); Bente Adriaan Bordes, Eindhoven (NL); Herbert Lifka, Eindhoven (NL); Gerjan Franciscus Arthur Van De Walle, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 370 days.

(21) Appl. No.: 09/772,322

(22) Filed: Jan. 26, 2001

(65) Prior Publication Data

US 2003/0042572 A1 Mar. 6, 2003

(51) Int. Cl.[7] .................................................. H05K 7/06
(52) U.S. Cl. ....................... 361/792; 361/793; 361/795; 257/700; 257/724
(58) Field of Search ................................ 361/761–764, 361/792–795, 780, 782, 783; 343/700 MS, 702, 873; 257/E27.113, E27.114, 700, 724, 728, 759, 760

(56) References Cited

U.S. PATENT DOCUMENTS 5,430,441 A * 7/1995 Bickley et al. ............ 340/10.2
6,459,588 B1 * 10/2002 Morizumi et al. .......... 361/737

* cited by examiner

Primary Examiner—David L. Talbott
Assistant Examiner—John B. Vigushin
(74) Attorney, Agent, or Firm—Daniel J. Piotroski (57) ABSTRACT

The invention relates to a transponder provided with an integrated circuit, an antenna, and a first capacitor provided with a dielectric and a first and a second capacitor electrode, which transponder comprises a stack of layers, i.e.:
- a first layer of a dielectric material,
- a first patterned electrically conductive layer of which the antenna forms part,
- a second layer of a dielectric material, and
- a second patterned electrically conductive layer.

The invention further relates to an appliance provided with a transponder which comprises an integrated circuit, an antenna, and a first capacitor.

10 Claims, 5 Drawing Sheets

TRANSPONDER AND APPLIANCE

FIELD OF THE INVENTION

The invention relates to a transponder provided with an integrated circuit, an antenna, and a first capacitor provided with a dielectric and a first and a second capacitor electrode, which transponder comprises a stack of layers, i.e.:
- a first layer of a dielectric material,
- a first patterned electrically conductive layer of which the antenna forms part,
- a second layer of a dielectric material, and
- a second patterned electrically conductive layer.

The invention further relates to an appliance provided with a transponder which comprises an integrated circuit, an antenna, and a first capacitor.

BACKGROUND OF THE INVENTION

Such a transponder is known from EP-A-840251. The second layer of dielectric material in the known transponder is the dielectric of the capacitor and at the same time the substrate. The transponder comprises an electrically conductive connection which is passed through the second layer of dielectric material. This connection is present in the form of a metal-filled hole in the second layer. The integrated circuit—also referred to hereinafter as IC—of the known transponder is separately manufactured and is provided on the second patterned layer in an assembling step. To protect the second patterned layer and the IC, the known transponder comprises a top layer of dielectric material. The antenna of the known transponder is present in the first patterned layer which is manufactured separately from the second patterned layer on the first layer of dielectric material. The two halves of the transponder are subsequently assembled together.

A disadvantage of the known transponder is that its cost price is high, as an assembling step of the IC is necessary.

SUMMARY OF THE INVENTION

It is a first object of the invention to provide a transponder of the kind described in the opening paragraph which can be manufactured at a low cost price. A second object of the invention is to provide an appliance of the kind mentioned in the second paragraph which comprises a transponder which can be integrated in the appliance in a simple manner.

The first object is achieved in that the second patterned layer comprises a first electrode of the integrated circuit and the second capacitor electrode.

The second patterned layer does not only comprise the second capacitor electrode, as in the cited application, but also the first electrode of the IC. Instead of assembling an IC, the IC is processed onto the second layer or a further layer of dielectric material. An additional advantage of said processed IC is that bonding problems are absent. Such problems include a bad electrical connection, a bad adhesion to the second layer of dielectric material. Further on, the flexibility of the IC is enhanced in that a processed IC can be flexible whereas an assembled IC is not. Another advantage is that in the design the condition of ease of assemblage of the IC is absent. This condition being absent, the design can be optimized to have large capacitor electrodes and large contact surfaces, if present. In the case that in the manufacture of the transponder two halves are processed independently and assembled during a later step, the large size of electrodes and contact surfaces facilitates an easy assembly of both halves.

The processed IC further comprises other parts such as a semiconductor and a second electrode. These parts may be present in the form of doped regions in a layer of a semiconducting material such as silicon. The IC may alternatively comprise a layered structure. The first electrode of the IC may form part of a first transistor or of a first diode. Preferably, the IC comprises several transistors as well as interconnect lines between the transistors. Said interconnect lines can be present in the second patterned electrically conductive layer. Preferably, the IC further comprises one or several memory elements.

It is advantageous that the second layer of dielectric material is the dielectric of the first capacitor and comprises a first interconnection between the antenna and the integrated circuit. In this case, the second layer of dielectric material is not only the dielectric of the first capacitor, but it also has the functions of an insulator between and of a protective layer for the first and the second patterned layer. Preferably, the dielectric material of the second layer has a relative dielectric constant $\in_r$ of approximately 3 to 30. A semiconducting layer may be in contact with the layer of dielectric material. Preferably, the semiconducting layer is thinner than the second layer of dielectric material.

By preference, the first patterned layer comprises not only the antenna, but also the first capacitor electrode. This layer may in addition comprise a first contact surface which is in contact with or forms part of a first connection. Preferably, the integrated circuit is connected to the antenna by means of this first interconnection.

There are various embodiments of the transponder according to the invention which differ from one another in the nature of the interconnection between the antenna and the IC. The number of connections is at least two, because the antenna and IC form part of a closed electric circuit. In a first embodiment, there is a connection between the first and the second patterned layer through the second layer of dielectric material, which second layer is patterned. There are various methods for the manufacture of a hole in the second layer which is then to be filled—a connection which is known to those skilled in the art as a vertical interconnect area or via—, for example, a mechanical and a photochemical method.

In a second embodiment, there is an interconnection between the first and the second patterned layer which extends outside the layer of dielectric material. This embodiment has the advantage that no through hole need be filled, which would be an additional step in the manufacture. In a third embodiment, there is a connection at the outside of the transponder. Such a connection comprises roughly a U-shaped part.

In a fourth, favorable embodiment of the transponder, the first capacitor constitutes the interconnection. A first advantage of the use of capacitors as interconnect members is that this saves a patterning of the second layer of dielectric material. A second advantage is that no problems can arise as regards positioning of the second patterned layer with respect to the first.

The antenna in the transponder according to the invention serves for communication with a base station. At least three techniques are known by which such a communication can take place. The first technique is inductive coupling, where the communication takes place magnetically. When this technique is used, a coil is present in the pattern of the first layer on the transponder, and a capacitor is present in a tuned circuit. The second technique is capacitive coupling, where the communication takes place electrically. In this case, two capacitor plates are present on the transponder, which plates communicate with one or several capacitor plates in the base station. A diode is further present in the tuned circuit. The third technique makes use of radiation, i.e. communication takes place by electromagnetic means.

The integrated circuit in the transponder according to the invention is present in an electric circuit which is usually operated with direct current. Since the tuned circuit is usually operated with alternating current, a diode and a capacitor will mostly be present in the current path of the integrated circuit. Preferably, the diode is integrated into the IC. The diode may be present in the form of a field effect transistor provided with a gate, a source, and a drain electrode, the gate electrode being short-circuited with the source or drain electrode. The capacitor referred to above has a smoothing function. Said capacitor may be integrated into the IC, the dielectric between the gate electrode and the semiconducting layer being at the same time the dielectric of this capacitor. Said capacitor may alternatively be integrated into the layer structure of the first patterned layer, the second dielectric layer, and the second patterned layer.

Capacitors in the transponder according to the invention accordingly serve to fulfill at least one of the following functions: smoothing the signal supplied by the diode; providing resonance if the antenna is a coil; interconnecting the antenna and the integrated circuit; and providing a capacitive coupling to a base station. Although the capacitors will be different from an electrical point of view in dependence on these functions, they are comparable from a physical point of view.

It is preferable for all capacitors present to be integrated into the layer structure which is formed by the first patterned electrically conductive layer, the second layer of dielectric material, and the second patterned electrically conductive layer. Interference with the integrated circuit by the capacitors is thereby prevented. This is true in particular if polymeric materials are used for one or several layers with conductive patterns and for the semiconducting layer. Interference with the integrated circuit by parasitic capacitors is much stronger with the use of such materials than with the use of conventional integrated circuits based on silicon.

It is realized in a favorable embodiment that
  the first patterned layer comprises the first and a third capacitor electrode,
  the second patterned layer comprises a fourth capacitor electrode,
  the third and the fourth capacitor electrode form a second capacitor in conjunction with the second layer of dielectric material,
  the first capacitor forms the first connection between the integrated circuit and the antenna, and
  the second capacitor forms a second connection between the antenna and the integrated circuit.

In this embodiment, the first and the third capacitor electrode preferably form the antenna of the transponder, which antenna receives power and transmits signals through capacitive coupling to a base station during operation. The capacitor electrodes at the same time form part of the connections between the antenna and the integrated circuit. The second layer of dielectric material is the dielectric of both the first and the second capacitor, and preferably also the substrate for the second layer. Since these layers of the transponder have a dual function, the number of components of the transponder is comparatively small. The cost price of the transponder is comparatively low as a result. A stack comprising a semiconducting layer, a dielectric, and a third layer may additionally be present on the second patterned electrically conductive layer. The presence of these layers is dependent on the type of integrated circuit which is used in the transponder.

In a special embodiment, the first patterned layer occupies a larger surface area than does the second patterned layer. Preferably, the first layer of dielectric material forms the substrate for the first patterned layer, and the second layer of dielectric material forms the substrate for the second patterned layer, while the first layer of dielectric material has a larger surface area than the second layer of dielectric material. In this embodiment, the surface of the second patterned layer in which the first electrode of the integrated circuit is provided has comparatively small dimensions. The number of integrated circuits with capacitor electrodes which can be manufactured on one wafer is accordingly great. This is important for the cost price both in the case of an integrated circuit based on silicon and in the case of an organic integrated circuit. The size of the first patterned layer on the other hand may lie within wide limits. This has the advantage that the range of the antenna is not limited by the size of the second patterned layer.

In a further embodiment, the integrated circuit has a layered structure. The IC in this embodiment has a second electrode, while
  a stack of a semiconducting layer, a third layer of dielectric material, and a third patterned electrically conductive layer comprising the second electrode of the integrated circuit is present on the second patterned layer, and
  a fourth layer of dielectric material is present on said stack.

The integrated circuit is provided in the second patterned layer and the stack. This IC comprises a first transistor with inter alia a source, a drain, and a gate electrode, the source and drain electrodes lying in the same patterned layer and the gate electrode lying in a different patterned layer. The integrated circuit preferably further comprises a first memory element and electrical conductors for the interconnection of elements in the circuit such as the first transistor and the first memory element. The stack may be built up in the order: semiconducting layer, third layer of dielectric material, and third patterned layer. An alternative sequence is also possible: third layer of dielectric material, semiconducting layer, and third patterned layer. The further sequence is possible: third layer of dielectric material, third patterned layer, and semiconducting layer.

A first advantage of this embodiment is that it can be manufactured in a simple manner. The fourth layer of dielectric material may be used as a second substrate, while the first layer of dielectric material is used as the first substrate. Both substrates may thus be provided with a patterned layer independently of one another. This is favorable because the dimensions of the patterns in the first and in the second patterned layer are usually strongly different. The transponder is obtained by assembling the two substrates together. Preferably, the first and the fourth layer of dielectric material for this purpose have a larger surface area than the patterned layer deposited thereon, so that end portions of the first and the fourth layer are exposed. These end portions are in contact with one another and fixed together after being assembled.

A second advantage of the embodiment with a fourth layer of dielectric material is the possibility of a connection between the IC and the antenna through contact surfaces laterally of the second layer of dielectric material. It is possible to obtain a via without a hole in the second layer of dielectric material having to be filled with electrically conductive material. This saves one process step. In addition, the connection thus obtained is very robust because a large contact surface area is present between the contact surfaces which form part of the first and the second patterned layer.

A third advantage of the embodiment of the transponder according to the invention is that the first and the fourth layer of dielectric material may be laminated together, so that a substantially uninterrupted protective layer is present. The protective layer provides protection against damage which could arise from chemical, electrical, or mechanical causes. This layer need not be provided in an additional step, which reduces the cost price as well as the thickness of the transponder.

In a favorable embodiment, at least one of the layers comprises mainly organic material. An IC having one or several layers of organic material has a comparatively low cost price on account of low material costs and because large numbers of the IC can be manufactured in one batch. A layer of organic material can be provided on a substrate in a simple manner by a coating technique, such as web coating or spin coating. A number of materials have been described for which it is possible to pattern the provided layer subsequently without necessarily using an etching mask. Examples are inter alia polyanilines, photoresists, and polythiophenes in combination with polyacids. A transponder which is composed entirely or partly from organic materials has a comparatively low mass and a comparatively small thickness. This is advantageous if the transponder according to the invention is used as an indetachable component of a variety of appliances such as paper money and other valuable papers, packagings, and toys. The first layer of dielectric material, which is coated with the first patterned layer on its upper surface, may be provided with a glue layer on its bottom surface.

Preferably, a semiconducting layer of organic material is used. This semiconducting material has the advantage that no separate doping need be provided. In addition, the material can be provided in a simple manner by spin or web coating. Examples of semiconducting organic materials are pentacene, polythiophene, polythienylene-vinylene, polyphenylene-vinylene, polyfuranylene-vinylene, polypyrrole, polyacetylene, polyfurane, and polyaniline. Substituted variants of these materials may alternatively be used. Examples of substituents are alkyl, alkoxy, and alkylalkoxy groups and ring-shaped groups such as alkylenedioxy groups. Such groups are preferably $C_1$ to $C_{10}$-alkyl, -alkoxy, or -alkylenedioxy.

It is furthermore advantageous when at least one of the patterned layers comprises a doped organic polymeric material. Preferably, the second and the third patterned layer comprise organic polymeric material. Advantages of this are inter alia the cost saving and the flexibility of the material. Furthermore, a layer of doped organic polymeric material can be provided in a simple manner and patterned on a flexible substrate. It is preferable that a patterned layer of organic material forms a relief, the electrically non-conducting regions of the layer being removed. Examples of organic materials which may be used after doping as electrically conductive materials are inter alia polyaniline, polythiophene, poly(p-phenylene sulfide), and copolymers of these materials. Other useful materials are substituted variants of the above materials. Examples of substituents are alkyl, alkoxy, and alkylalkoxy groups and ring-shaped groups. Particular examples are poly-3-alkylthiophenes, poly-3,4-dialkoxythiophenes, poly-3,4-alkylthiophenes, and poly-3,4-alkylenedioxythiophenes. Such substituted groups are preferably $C_1$ to $C_{10}$-alkyl, alkoxy, or alkylenedioxy.

Other examples of electrically conductive materials which can be used in the patterned electrically conductive layers are gold, copper, TiN, TiW, doped silicon, aluminum, cobalt, titanium and other metals and alloys. Examples of materials which can be used in the first, second and fourth layers of dielectric material, include polyimide, polyethylene terephthalate (PET) and paper. Layers of such a material can act as a substrate of a transponder very well.

The second object of the invention is realized in an appliance of the kind mentioned in the opening paragraphs in that the transponder according to the invention is present therein. The integration of the IC in the transponder according to the invention and the use of the same dielectric layers as a substrate and as a protective layer mean that the transponder has a smaller thickness and a lower weight than the known transponder. As a result, the appliance can contain a transponder which can be well integrated in a simple manner. Examples of appliances are inter alia paper money and other valuable papers, packagings, toys, clothing, and domestic appliances. A first advantage of the appliance according to the invention is that it is identifiable, while the identification member has a flexible shape. A second advantage is that the transponder is inexpensive. A third advantage, particularly valid when organic materials are used in the transponder, is that there are no materials present which are unsuitable for combustion in refuse incinerators.

BRIEF DESCRIPTION OF THE DRAWINGS

These and other aspects of the invention will be explained in more detail with reference to drawings, in which.

DETAILED DESCRIPTION OF THE DRAWINGS

Figure 1:
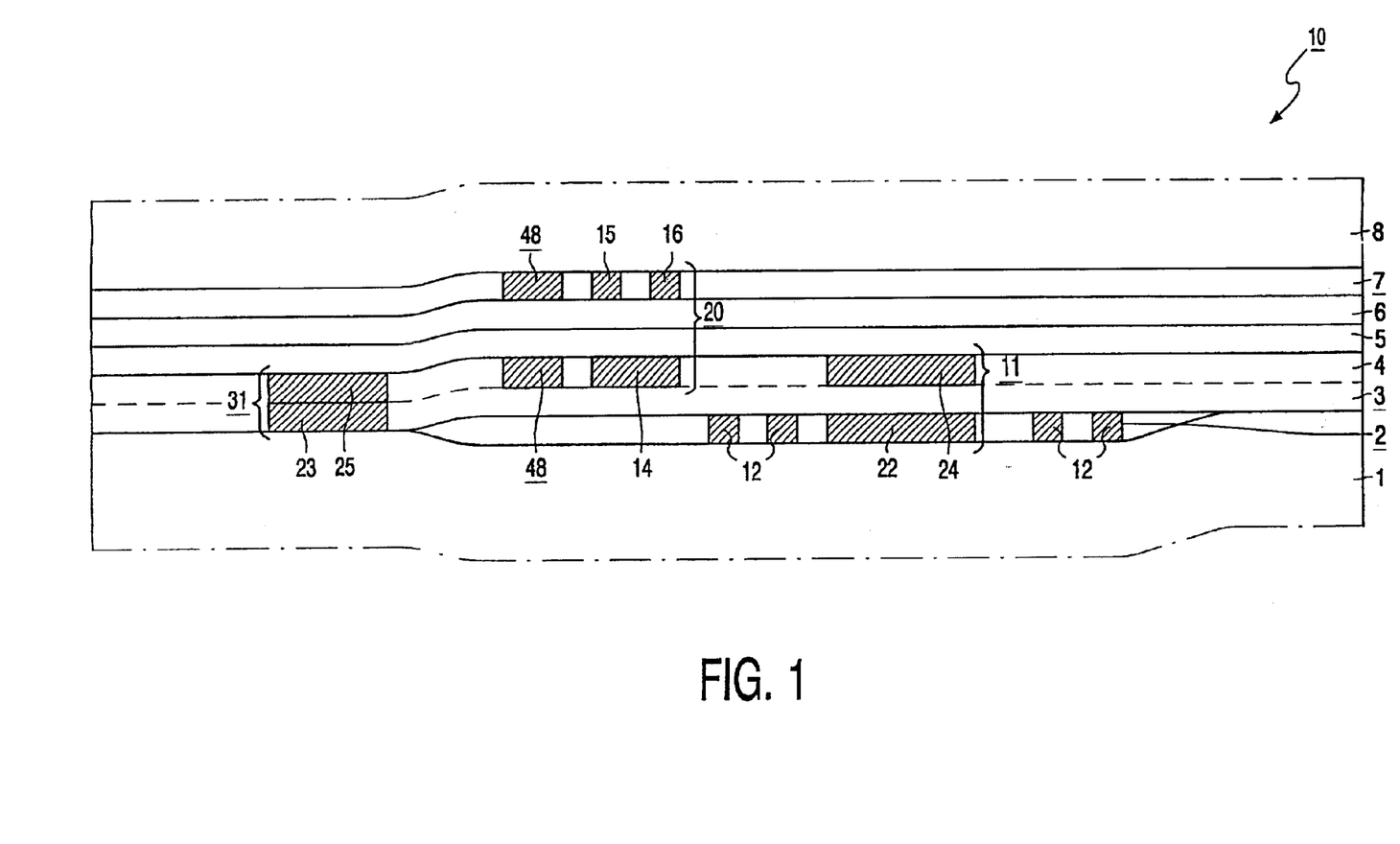
FIG. 1 is a diagrammatic cross-sectional view of a first embodiment of the transponder.

FIG. 1 is a diagrammatic cross-sectional view of a first transponder 10. The transponder comprises a first layer of dielectric material 1, a first patterned layer 2, a second layer of dielectric material 3, a second patterned layer 4, a third layer of dielectric material 5, a semiconducting layer 6, a third patterned layer 7, and a fourth layer of dielectric material 8.

Figure 2:
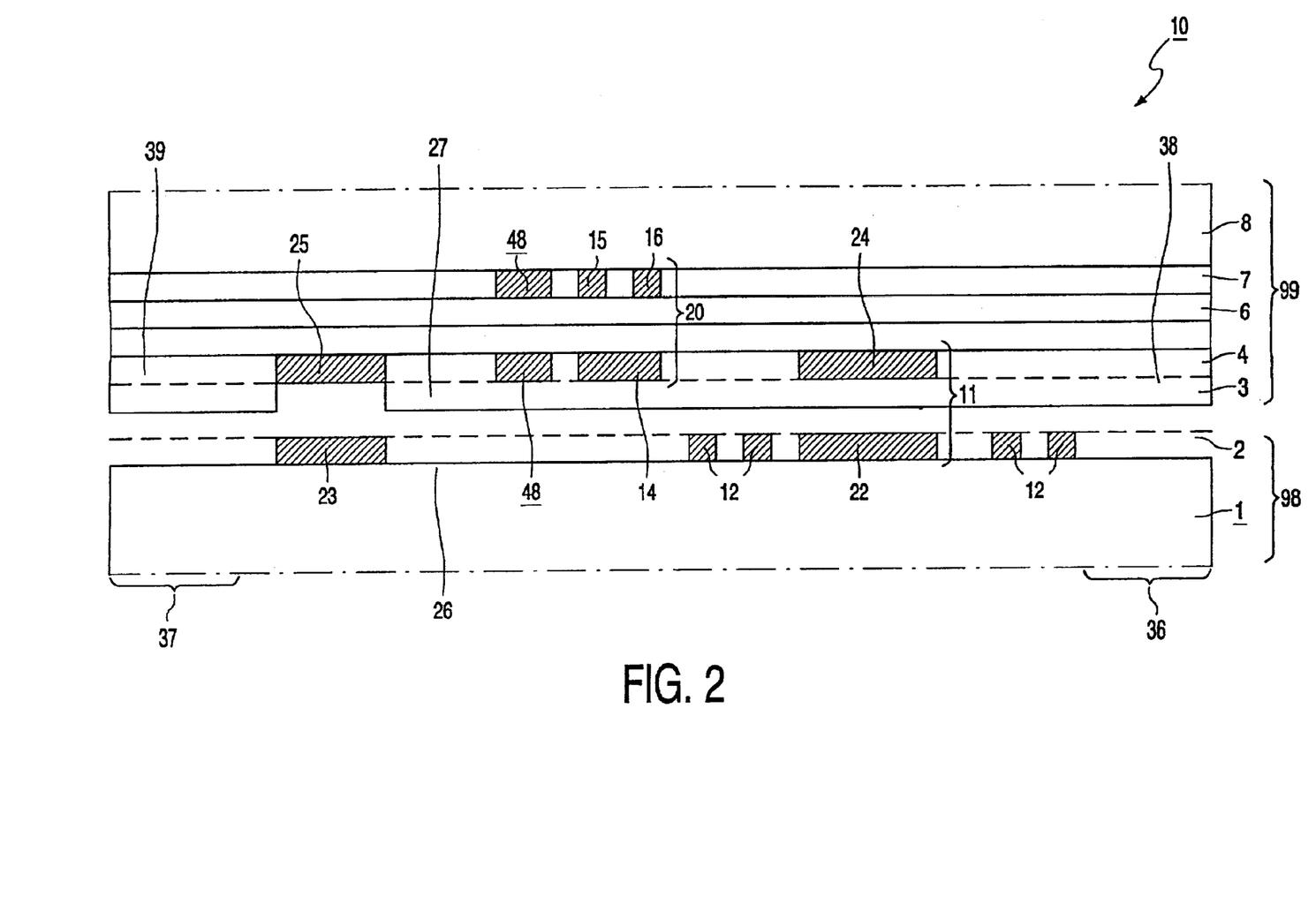
FIG. 2 is a second diagrammatic cross-sectional view of the first embodiment of the transponder during its manufacture.

The third layer 5, the semiconducting layer 6, and the third patterned layer 7 are not shown in FIG. 1 for the sake of clarity. FIG. 2 is a diagrammatic cross-sectional view of the first transponder 10 with the upper half 99 and the lower half 98 not yet attached to one another.

The patterned layer 2 comprises an antenna 12 which in this case comprises a spiraling pattern. The antenna 12 communicates with a base station 90 by means of inductive coupling. The patterned layer 2 also comprises a first capacitor electrode 22 which together with the second capacitor electrode 24 in the second patterned layer 4 and the interposed second layer of dielectric material 3 forms the first capacitor 11. The second patterned layer 4 further comprises a first electrode 14 of the integrated circuit 20. The electrode 14 forms the gate electrode of a first transistor of the integrated circuit 20. The source electrode 15 and the drain electrode 16 are present in the third patterned layer 7. When an inhomogeneous charge distribution is generated in the semiconducting layer 6 by the gate electrode, a current can flow between the source electrode 15 and the drain electrode 16. A voltage difference between the two electrodes 15 and 16 is required for this. The third layer of dielectric material 5 insulates the gate electrode 14 from the source and drain electrodes 15 and 16. The third layer 5 is also the dielectric of a smoothing capacitor (not shown) which is integrated into the IC 20. The third layer 5 is patterned and comprises vias (not shown) by means of which electrical conductors in the IC are interconnected. A first connection between the integrated circuit 20 and the antenna 12 is the via 31, which comprises a first contact surface 23 and a second contact surface 25. The patterned layers on both sides 26 and 27 of the contact surfaces 23 and 25 are substantially free from electrical conductors so as to achieve a good contact between the contact surfaces 23 and 25. These regions 26 and 27 are sealed. The edge zones 36, 37 of the first layer 1 and the edge zones 38, 39 of the fourth layer 8 are in contact with one another. Obviously, electrical conductors 42, 44—shown in FIG. 3—are present in the first and in the second patterned layer 2, 4, by means of which conductors the contact surfaces 23, 25 are connected to other components of the transponder.

The first transponder is manufactured as follows. The first layer of dielectric material 1 is the first substrate on which the first patterned layer 2 is provided. The patterned layer 2 comprises a first contact surface 23, a first capacitor electrode 22, and an antenna 12. The first layer 1 comprises polyimide, and the first patterned layer comprises mainly copper. The copper is provided by electrodeposition, whereupon it is patterned by means of an etching mask. It is also possible to use the electroplating technique. In that case, a layer of organic polymeric material is first provided and patterned. Then copper is deposited, said copper depositing mainly on the electrically conductive portions of the organic polymeric material.

The fourth layer of dielectric material 8 is used as a carrier. This carrier is planarized with a layer of polyvinylphenol cross-linked with hexamethoxymethylenemelamine (HMMM). The laminate of the fourth layer 8 and the layer of polyvinylphenol forms the second substrate. A layer 7 of a first conductive material is deposited on this second substrate. The first conductive material may be a metal, such as gold or aluminum, but in this case it is a composite material of poly(3,4-ethylenedioxythiophene) and poly(styrenesulfonic acid). The layer 7 is provided by spin coating of a colloidal solution in water. The layer 7 is dried and subsequently exposed in accordance with a desired pattern. The pattern of the layer 7 comprises a source electrode 15 and a drain electrode 16. This pattern occurs a number of times on the second substrate, so that a large number of organic components of the transponder 10 can be manufactured in one operation. The patterns of the other layers 5, 4, and 3 also occur the same number of times. The pattern in addition comprises conductors. Then a layer 6 comprising a precursor polymer of polythienylene-vinylene is provided on the layer 7 by spin coating. This precursor polymer is converted into polythienylene-vinylene by heating. A layer 5 of an organic dielectric material such as, for example, polyvinylphenol is provided on the layer 6. The layer is planarized and patterned by exposure and subsequent development. A second layer 4 of the doped organic polymeric composite material of poly(3,4-ethylenedioxythiophene) and poly(styrenesulfonic acid) is deposited on the patterned layer 5. Holes in the layer 5 of dielectric material are filled up thereby, so that vias are created between the layers 4 and 7. The layer 4 is subsequently brought into a desired pattern through exposure and subsequent washing, which pattern is different from the pattern of the layer 7. The pattern of the layer 4 comprises a conductive plate 24, an electrode 14, and a contact surface 25. This patterning completes the IC 20. Then a layer 3 of a dielectric material, such as the commercially available HPR504, is provided by spin coating. This layer 3 is brought into a desired pattern, the dielectric material being removed from the contact surface 25. The layer structure thus formed on the second substrate is subsequently cut, so that a number of halves of the transponder 10 is created, one of which is shown in a diagrammatic cross-section in FIG. 1. The first and the second substrate are now assembled together such that the contact surfaces 23, 25 and the conductive plates 22, 24 lie opposite one another. The edge zones 36 and 38, 37 and 39, and the regions 26, 27 are now adhered together. The connection 21 between the contact surfaces 23 and 25 is formed thereby. In addition, the layers 1 and 8 form protective layers. The transponder 10 has thus been manufactured.

Figure 3:
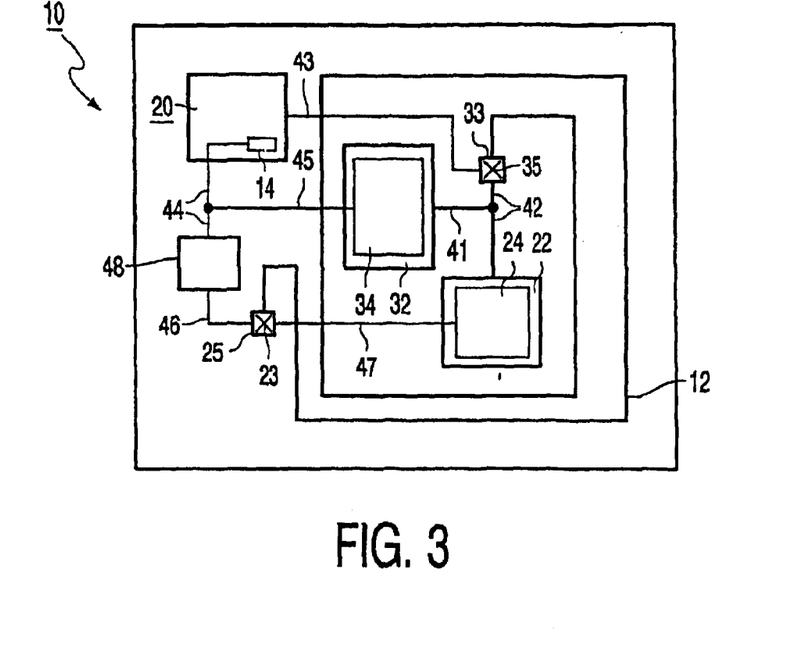
FIG. 3 is a diagrammatic plan view of the first embodiment of the transponder.

FIG. 3 is a diagrammatic plan view in which the first patterned layer 2 and the second patterned layer 4 of the transponder 10 are shown. The first patterned layer 2 comprises the antenna 12, the first capacitor electrode 22, a third capacitor electrode 32, the first contact surface 23, and a third contact surface 33. In addition, the first patterned electrically conductive layer 2 comprises electrical conductors 41, 42. The second patterned electrically conductive layer 4 comprises the second capacitor electrode 24, a fourth capacitor electrode 34, the second contact surface 25, and a fourth contact surface 35. The second layer 4 further comprises the first electrode 14 of the IC 20, a diode 48, and electrical conductors 43, 44, 45, 46, 47. The second and fourth contact surfaces 33 and 35 together form the second via 31.

Figure 4:
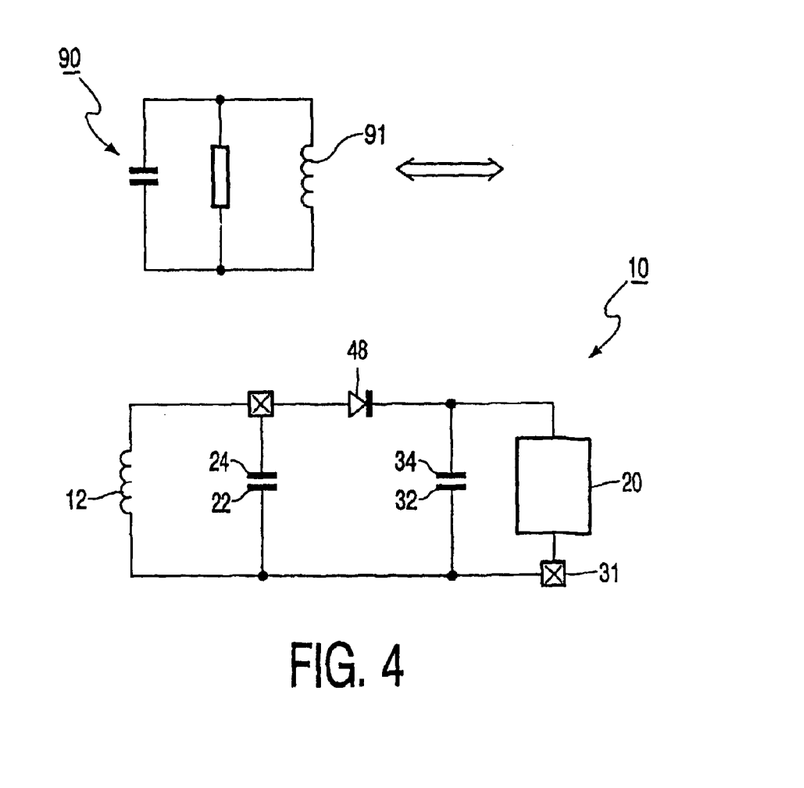
FIG. 4 is an electric circuit diagram of the first embodiment of the transponder and a base station.

The transponder operates as follows, cf. also FIG. 4. The transponder receives power and signals from a base station 90 with a coil 91 through the antenna 12. A current will now flow through the circuit which comprises a tuned circuit and an IC. The current flows as follows in the tuned circuit: the current reaches the first capacitor 11 comprising the first capacitor electrode 22 and the second capacitor electrode 24 through the electrical conductors 33 and 42. The first capacitor 11 is a resonance capacitor. The current then flows through the electrical conductor 47 to the second contact surface 25, from where the current reaches the first contact surface 23 and the antenna 12 through the via 21, whereby the tuned circuit is closed. This circuit may also be traversed in the reverse direction. In the IC, the current flows from the third contact surface 33 through electrical conductors 42 to the first capacitor 11 provided with capacitor electrodes 22 and 24. The current then flows through the electrical conductors 47 and 46 to the diode 48, which rectifies the current. Downstream thereof, a second capacitor 13 with the third and fourth capacitor electrodes 32, 34 and the IC 20 are connected in parallel.

Figure 5:
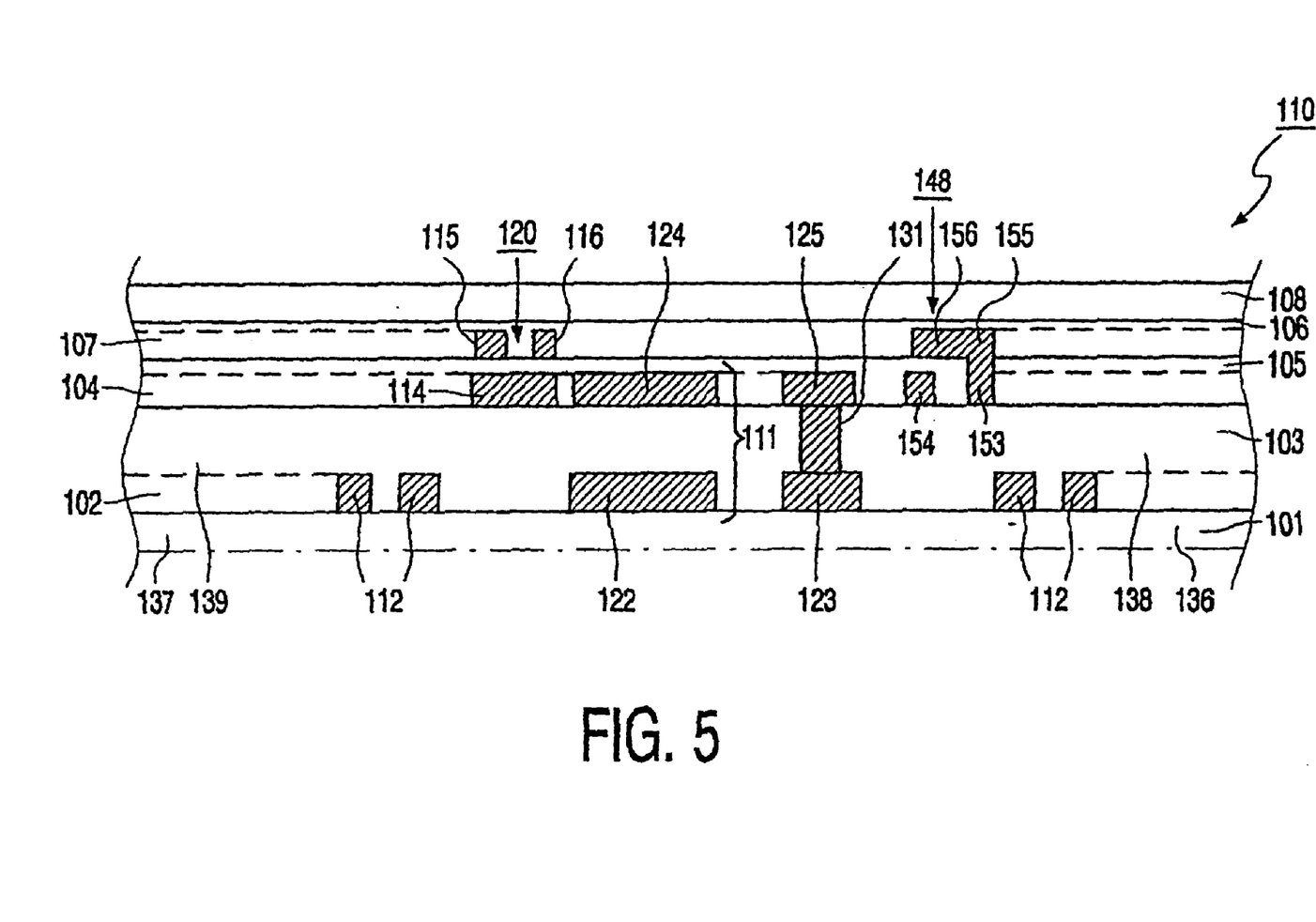
FIG. 5 is a diagrammatic cross-sectional view of a second embodiment of the transponder.

FIG. 5 is a diagrammatic cross-sectional view of a second transponder 110 according to the invention. On a first layer of a dielectric material 101 lies a first patterned electrically conductive layer 102, which layer 102 comprises a first capacitor electrode 122, a coil-shaped antenna 112, and a first contact surface 123. A second layer of dielectric material 103 is present on the first patterned layer 102. The second layer 103 is patterned and comprises a first via 131. The upper surface of the second layer of dielectric material 103 is planarized and serves as a surface for the second patterned layer 104. This layer 104 comprises a second capacitor electrode 124 which together with the first capacitor electrode 122 and the second layer of dielectric material 103 forms the first capacitor 111. The second layer 104 further comprises a second contact surface 125, a first conductor 153, a first electrode 154 of diode 148 and the first electrode 114 of the integrated circuit 120. A third layer of dielectric material 105, a third patterned electrically conductive layer 107, and a semiconducting layer 106 are present on the second patterned layer 104. The third patterned layer comprises a second and a third electrode 115, 116 of the IC 120, a second electrode 156 of the diode 148, and a second conductor 155. A conductive connection 151 between the first and the second conductor 153, 155 is present in the third layer of dielectric material 105. The edge zones 136, 137 of the first layer 101 and the edge zones 138, 139 of the second layer 103 are in contact with one another; at the same time the fourth layer of dielectric material 108 forms a closed surface. The transponder 110 as a result has a protective layer comprising the layers 101 and 108.

Figure 6:
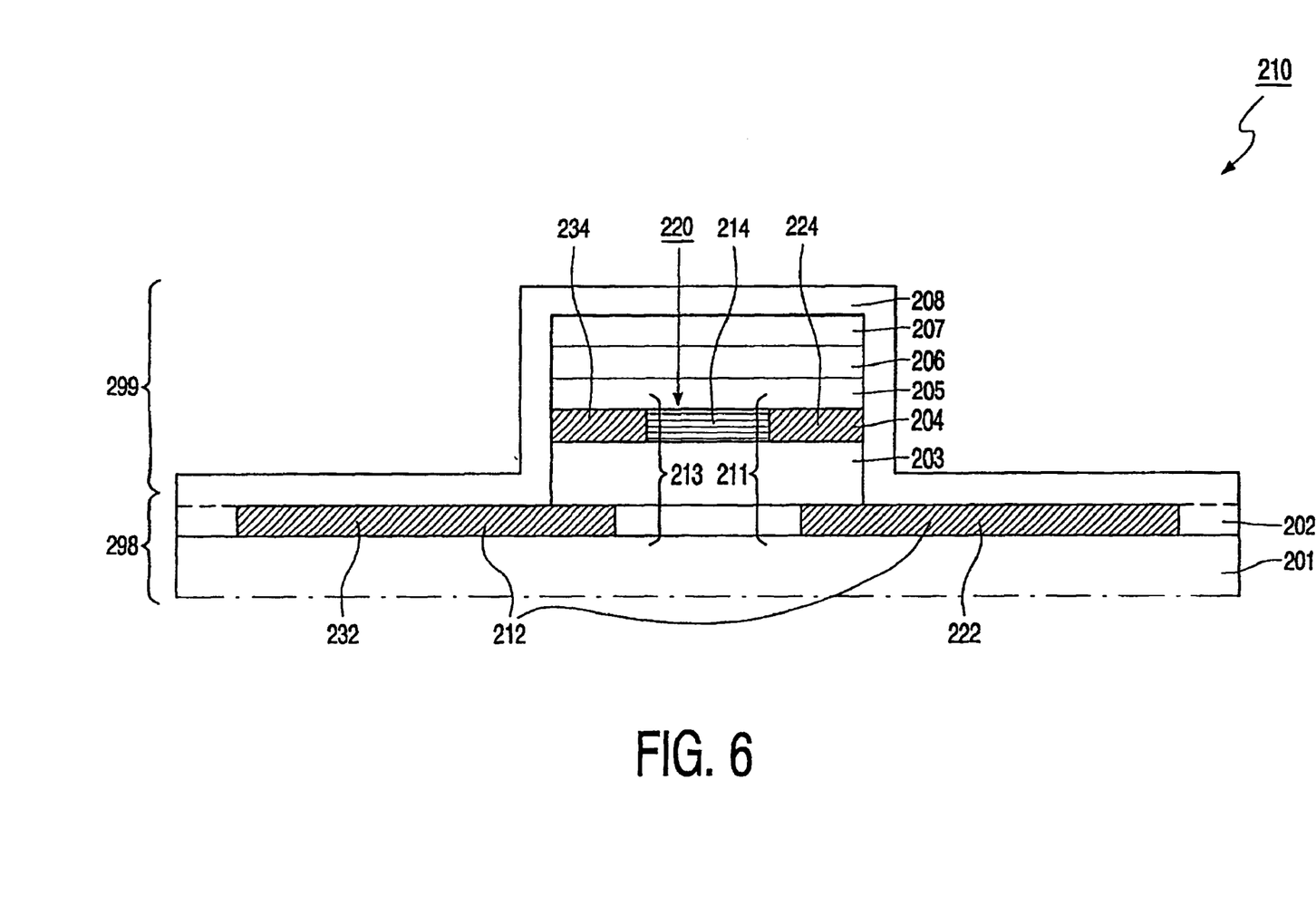
FIG. 6 is a diagrammatic cross-sectional view of a third embodiment of the transponder.

FIG. 6 is a diagrammatic cross-sectional view of a third transponder 210 according to the invention which comprises a first capacitor 211, a second capacitor 213, an integrated circuit 220, and an antenna 212. On a first layer of dielectric material 201 lies a first patterned electrically conductive layer 202 in which a first capacitor electrode 222 and a third capacitor electrode 232 are present. A second layer of dielectric material 203, on which a second patterned layer 204 is present, lies on the first patterned layer 202. The surface area of the layer 203 is smaller than the surface area of the layer 201. The second patterned layer 204 comprises a second and a fourth capacitor electrode 224, 234, and a first electrode 214 of the IC 220. The second patterned layer 204 comprises aluminum. The conductive plates are positioned such that the first and the second capacitor electrode 222, 224 overlap and the third and the fourth capacitor electrode 232, 234 overlap. A number of layers 205, 206, 207 is present on the second patterned layer. A protective layer 208 is additionally present for the protection of the transponder 210.

During manufacture of the third transponder, a first half 298 comprising the layers 201 and 202 and a second half 299 comprising the layers 203, 204, 205, 206, and 207 are initially manufactured independently of one another. The application of the first patterned layer 202 on the first layer 201 takes place in a usual manner. The application of the second patterned layer 204 comprising aluminum on the second layer of dielectric material 203 takes place in a manner described in U.S. Pat. No. 5,736,452, but may alternatively take place in a different manner. A hybrid semiconductor device comprising the second patterned layer 204 with the first electrode 214 and the second and the fourth capacitor electrode 224, 234 is provided on a silicon substrate. A first passivating layer of a dielectric material is provided on the second patterned layer 204, then a thin glue layer, and then a second layer of dielectric material 203. This layer is preferably flexible, it is preferably made of a polymeric material. The first substrate is etched away and replaced with a third layer of dielectric material 205. The second half 299 is positioned on the first half 298. Either the second layer 203 or the third layer 205 of dielectric material may be at the lower side during this position. In the drawing, the second layer 203 is present at the lower side. The second half 299 is fixed through the application of the protective layer 208.

In an alternative embodiment of the third transponder 210, the second half 299 is different. In this embodiment, the second layer of dielectric material 203 is made of paper. Onto this, the second patterned layer 204 comprising copper is deposited. This is done by electroplating a thin layer in between of the second patterned layer 204 and the second layer of dielectric material. Onto the second patterned layer 204 a third layer of dielectric material 205, a semiconducting layer 206 and a third patterned electrically conductive layer 207 are deposited. Said patterned layers 204, 207 comprise patterns to demonstrate an IC, such as the patterned layers in the first transponder 10.

We claim:

1. A transponder provided with an integrated circuit, an antenna, and a first capacitor provided with a dielectric and a first and a second capacitor electrode, which transponder comprising:
   a stack of layers including
   a first layer of a dielectric material,
   a first patterned electrically conductive layer of which the antenna forms part,
   a second layer of a dielectric material, and
   a second patterned electrically conductive layer,
   wherein the second patterned layer comprises the second capacitor electrode and a first electrode of the integrated circuit, which enables the integrated circuit to be processed on the second layer.

2. A transponder provided with an integrated circuit, an antenna, and a first capacitor provided with a dielectric and a first and a second capacitor electrode, which transponder comprises a stack of layers, i.e.:
   a first layer of a dielectric material,
   a first patterned electrically conductive layer of which the antenna forms part,
   a second layer of a dielectric material,
   a second patterned electrically conductive layer,
   wherein the second patterned layer comprises the second capacitor electrode and a first electrode of the integrated circuit; wherein,
   the first patterned layer comprises the first and a third capacitor electrode,
   the second patterned layer comprises a fourth capacitor electrode,
   the third and the fourth capacitor electrodes form a second capacitor in conjunction with the second layer of dielectric material,
   the first capacitor forms a first connection between the integrated circuit and the antenna, and
   the second capacitor forms a second connection between the antenna and the integrated circuit.

3. A transponder as claimed in claim 2, wherein the antenna includes the first and the third capacitor electrode.

4. A transponder as claimed in claim 3, wherein the first patterned layer occupies a larger surface area than does the second patterned layer.

5. A transponder as claimed in claim 4, wherein the first patterned layer comprises a first contact surface, the second patterned layer comprises a second contact surface, and the first and the second contact surfaces are in contact with each other.

6. A transponder provided with an integrated circuit, an antenna, and a first capacitor provided with a dielectric and a first and a second capacitor electrode, which transponder comprises a stack of layers, i.e.:

a first layer of a dielectric material, a first patterned electrically conductive layer of which the antenna forms part, a second layer of a dielectric material, and a second patterned electrically conductive layer, wherein the second patterned layer comprises the second capacitor electrode and a first electrode of the integrated circuit; wherein the integrated circuit comprises a second electrode; a stack including a semiconducting layer, a third layer of dielectric material, and a third patterned electrically conductive layer that comprises the second electrode of the integrated circuit is present on the second patterned layer; and a fourth layer of dielectric material is present on said stack.

7. A transponder as claimed in claim 6, wherein the semiconducting layer comprises an organic material.

8. A transponder as claimed in claim 6, wherein at least one of the patterned layers comprises a doped organic polymeric material.

9. A transponder as claimed in claim 6, wherein edge zones of the first layer of dielectric material and edge zones of the second layer of dielectric material are adhered to one another, and a substantially uninterrupted protective layer comprising the first and the fourth layer of dielectric material is present.

10. An appliance provided with a transponder which comprises an integrated circuit, an antenna, and a first capacitor, wherein a transponder as claimed in any one of the preceding claims is present therein.

* * * * *